United States Patent
Lavigne et al.

(10) Patent No.: US 9,210,091 B2
(45) Date of Patent: Dec. 8, 2015

(54) SYSTEM AND METHODS FOR DISTRIBUTED OUTPUT PACKET METERING USING INPUT LOOKUPS

(75) Inventors: Bruce E. Lavigne, Roseville, CA (US); Mark Gooch, Roseville, CA (US); Alan R. Albrecht, Granite Bay, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1072 days.

(21) Appl. No.: 12/022,486

(22) Filed: Jan. 30, 2008

(65) Prior Publication Data
US 2009/0190486 A1    Jul. 30, 2009

(51) Int. Cl.
*H04L 12/26* (2006.01)
*H04L 12/801* (2013.01)
*H04L 12/833* (2013.01)

(52) U.S. Cl.
CPC .............. *H04L 47/33* (2013.01); *H04L 43/028* (2013.01); *H04L 43/0894* (2013.01); *H04L 47/31* (2013.01); *H04L 47/10* (2013.01); *H04L 47/11* (2013.01)

(58) Field of Classification Search
None
See application file for complete search history.

(56) References Cited

U.S. PATENT DOCUMENTS

| | | | |
|---|---|---|---|
| 6,266,705 B1 | 7/2001 | Ullum et al. | |
| 7,103,045 B2 | 9/2006 | Lavigne et al. | |
| 7,292,569 B1* | 11/2007 | Smith et al. | 370/383 |
| 2003/0169736 A1* | 9/2003 | Lavigne et al. | 370/392 |
| 2005/0047342 A1* | 3/2005 | Babiarz | 370/232 |
| 2006/0146887 A1* | 7/2006 | Muguruma et al. | 370/503 |
| 2010/0110918 A1* | 5/2010 | Mihaly et al. | 370/252 |

* cited by examiner

*Primary Examiner* — Khoa Huynh
(74) *Attorney, Agent, or Firm* — Fulbright & Jaworski L.L.P.

(57) ABSTRACT

System and methods for metering output packet traffic at network devices. Ingress packet lookups are employed in combination with egress packet meters, which can be arranged in parallel fashion, and used to meter traffic across multiple blades of a switch chassis. Also, egress packet traffic metering is accomplished while matching complex ingress rules without additional egress packet processing. The system has a first node for creating requests that contain a number of filter indicies for specifying packet forwarding criteria. The first node also specifies values for the filter and meter indicies based on a packet to be forwarded. The system also has a second node coupled to the first node and to a number of ports. The second node has at least one table for specifying which of the ports are to receive the packet based on the filter values, and at least one table for accounting for egress traffic bandwidth.

21 Claims, 6 Drawing Sheets

150

150

150

150

SYSTEM AND METHODS FOR DISTRIBUTED OUTPUT PACKET METERING USING INPUT LOOKUPS

TECHNICAL FIELD

The present invention generally relates to networks. More specifically, the present invention relates to forwarding packets while metering outgoing packet traffic at network devices.

BACKGROUND OF THE INVENTION

In networks, it is desirable to measure packet traffic coming into and going out of a network device. Networking devices, such as switches and routers, examine packets to determine how to forward the packets. The forwarding process requires packet processing, such as developing forwarding rules, security policies, as well as Quality of Service (QoS) policies, such as bandwidth metering.

The packet processing mentioned above is typically expensive, particularly if the packets are processed while coming into (ingress) or leaving from (egress) a network device. As known in the art, some network devices are able to measure incoming packet traffic, some network devices are able to measure outgoing packet traffic, and other network devices are able to measure both. However, these network devices leave much to be desired, either in terms of limited finctionality or in terms of undue operating/processing costs. Typically, network devices that are able to monitor both input and output packet traffic are unduly expensive, particularly in terms of hardware and process time. For example, tracking both ingress and egress packet traffic requires processing the packets multiple times, which is cost prohibitive. As such, to manage operating costs, network operators are often forced to use network devices that only process ingress traffic. However, in several applications it is highly desirable to meter egress packet traffic. That is, some egress processing is particularly desirable but cannot be otherwise accomplished on the ingress side of a network device.

By way of example, egress rate metering cannot effectively be performed on the ingress side of a network device, especially in a multi-chip implementation (e.g., a chassis switch). Specifically, egress rate metering cannot be performed on the ingress side of a device because each ingress chip is unaware of the processes performed by every other ingress chip. In similar fashion, in a purely egress-based solution, each egress chip would be unaware of the processes performed by every other egress chip. Accordingly, implementing a shared egress meter (e.g., metering the total bandwidth of a trunk which spans multiple chips) doesn't work in either environment.

To date, attempts to obviate the limitations described above generally include network devices that either perform packet-processing only during packet ingress, perform packet processing only during egress, or perform packet-processing during both ingress and egress. Network devices that perform packet-processing only during ingress are capable of mimicking some egress-type processing functionality by replicating logic on ingress. However, this approach leaves much to be desired as some functions, such as output metering with multiple chips, cannot be accomplished by this type of ingress processing alone. Further, network devices that perform egress packet processing only, e.g., hubs and shared-backplane switches, are generally unfavored. This is largely a result of the requirement that for such implementations, every ingress packet must be seen by every egress device in order to be processed. Accordingly, the required interconnect bandwidth quickly becomes cost prohibitive. Network devices that perform packet-processing during both ingress and egress are typically implemented as high-end devices that require separate, dedicated chips for each of ingress processing and egress processing and are likewise excessively expensive. Finally, it should be appreciated that attempts have been made that involve metering each port of each network device. However, these solutions typically lack packet processing functionality and cannot handle multi-chip output architectures.

BRIEF SUMMARY OF THE INVENTION

Embodiments of the present invention provide systems and methods for metering egress packet traffic while avoiding the requirement of processing packets multiple times. According to one embodiment, a first network device sends across filter and meter indices from the ingress side to the egress side to use in determining which ports the packets will be sent from. This is further accomplished by employing filters and attaching egress meters to obtain a true count of the egress packets. As a result, the requirement of processing the packets again on the egress side is obviated. Rather, meters placed on the egress side, that are indexed by the ingress-generated pointers, count the egress packet traffic.

According to another embodiment, accurate egress packet metering is accomplished on a chassis-wide basis. Moreover, metering can be accomplished in architectures having multiple ports, where those ports may span multiple blades.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
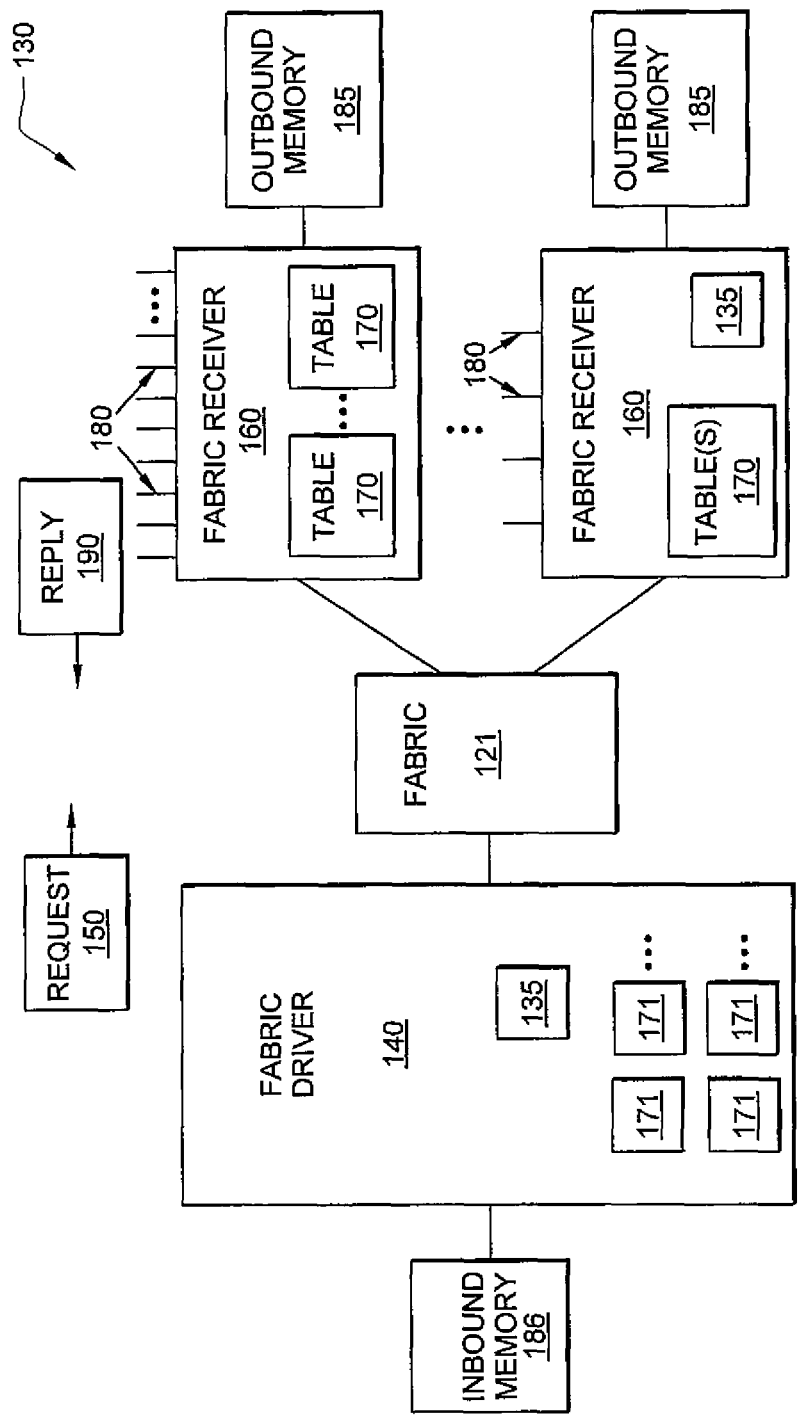
FIG. 1 is a block diagram of a system according to an embodiment of the present invention.

Embodiments of the present invention provide systems and methods for forwarding packets in a network while metering outgoing, i.e., egress, packet traffic on network devices. The systems and methods disclosed herein expand upon the systems and methods disclosed in U.S. Pat. No. 7,103,045, the disclosure of which is incorporated by the reference in its entirety. Further, preferred embodiments provide systems and methods of forwarding packets and metering output traffic where the packets are not required to be processed multiple times. Also, according to disclosed embodiments, a network operator is able to implement true chassis-wide output-based meters, where multiple inputs may go to multiple outputs, but the overall bandwidth is correctly metered. Finally, a network operator is able to attach these meters to individual user's unicast traffic, as well as to individual multicast streams.

It should be appreciated that, in the following discussion, use of the term "index" is meant to be interchangeable with the term "indices." While an index will generally be used to indicate the singular, it should be understood that the concepts discussed herein generally extend to multiple indices as well. Accordingly, singular terms (e.g., "index" or "meter") and plural terms (e.g., "indices" and "meters") to are generally interchangeable with one another in the following discussion.

Embodiments disclosed herein employ ingress packet processing logic and additionally create a meter index or multiple meter indices. The Egress meter is computed during packet ingress and is sent to each potential destination chip in a request message. According to a preferred embodiment, once the filter logic has determined that some port on the chip may receive the packet, the meter indices are used to access a bandwidth meter associated with this destination. The meter indices may be computed in any number of ways, including: destination MAC address lookup, destination IP address lookup, BMP (Best Match Prefix: IP subnet) lookup, or ACL (Access Control List) matches (including flows). Also, it should be appreciated that one index may be computed in a first manner while additional indices may be computed in the same or a different manner, in accordance with those described above. The meter may use a single rate (i.e. peak) if the only action on over-bandwidth is to drop, or, may be multi-rate, if other actions, such as ECN (Explicit Congestion Notification) marking, are possible. Potential destination chips receive a respective meter index in a request and maintain their meters to be in sync with meters on other destination chips. Further, the destination chips act on (e.g. drop or mark) packets when the combined bandwidth from all inputs exceeds a determined threshold.

According to embodiments described herein, metering can be implemented in a number of ways. The implementation will depend upon the placement of the meters relative to the port filters and buffer space considerations. In any event, the specific configured implementation will affect how a network operator perceives the packet traffic metering.

According to a first embodiment, the meter logic is applied before any port filters. In this case, a single meter may span multiple indices of the filter (e.g. one meter for multiple VLANs). In such case, the meters are unique across the entire chassis. However, it may be desirable to apply some filters before metering, e.g., those related to security—to prevent, for example, DoS attacks by depleting the meter with dropped packets, or to virtualize a meter by using the same index for different purposes on different egress blades. In such case, the meter cannot span multiple indices in that filter (e.g. VLAN). Instead, "virtual" meters are employed so that network device ports belonging to distinct values of the filter in question do not span blades (that is, if unique sets of VLANs, for example, are constrained to only certain blades).

In another embodiment, the meter is applied before buffer considerations. As a result, a network operator perceives the meter as applying to the amount of traffic destined to a network device, regardless of output congestion. If the meter is applied after buffer considerations, then the network operator perceives the meter as counting bandwidth as actually transmitted. This allows a meter to "play catch-up" in congested traffic conditions, after the congestion has passed.

Referring now to FIG. 1, a system according to an embodiment of the present invention is depicted as system 130. According to FIG. 1, system 130 comprises a first logical unit or first node, shown as fabric driver 140. Packets are received at system 130 and are input to inbound memory 186. From inbound memory 186, the packets flow to fabric driver 140, through fabric 121, to fabric Receiver 160, and finally to outbound memory 185.

The process by which packets are transferred from fabric driver 140, though fabric 121, to fabric receiver 160 is a request-reply process. That is, request 150, which is characterized by a number of filter indices that specify packet forwarding criteria, is sent by fabric driver 140 to fabric Receiver 160. The filter indices in request 150 serve to determine which of ports 180 receive packets based on criteria, such as VLAN membership, etc. In response, reply 190 is sent from fabric receiver 160 to fabric driver 140. Fabric receiver 160 comprises Tables 170 and logic within each table 170 is responsible for determining which of ports 180 will receive the requested packets.

As will be discussed in detail, some of tables 170 may have logic for determining which ports will receive the packets. However, at least one of tables 170 is dedicated to computing outgoing, or egress, metering values. That is, at least one of tables 170 will have logic, e.g., counters, for keeping track of the number of packets or bytes sent from the node. Such a configuration is advantageous because it ensures that, in an architecture having multiple nodes, e.g., an architecture having multiple fabric Receivers 160, those multiple fabric receivers 160 will be kept in sync. Accordingly, each of the ports that make up a corresponding multi-destination-chip trunk would be, for example, counted as one, at least in terms of the output bandwidth that is utilized.

Figure 2:
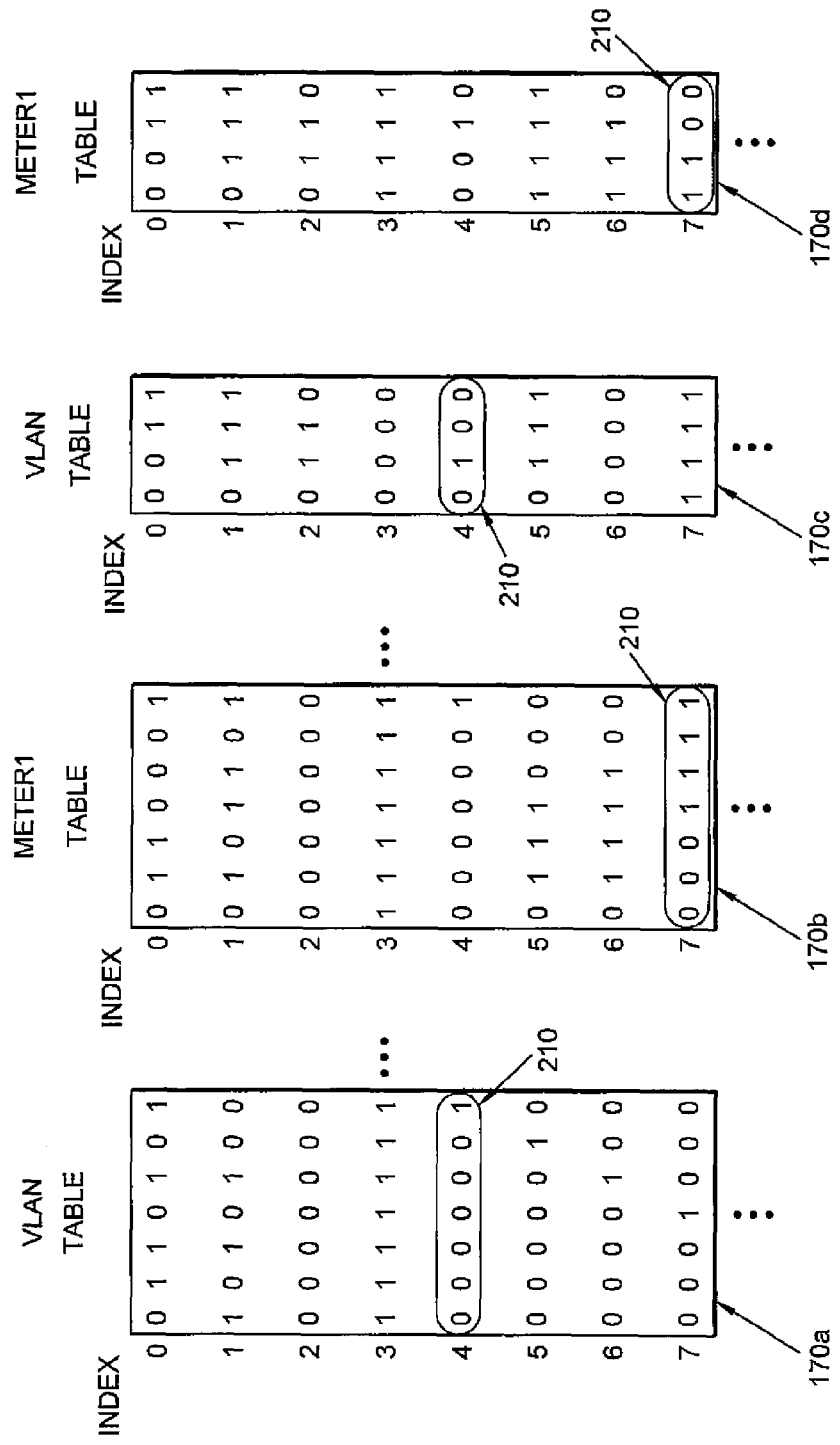
FIG. 2 is a diagram of a table of exemplary bit masks according to an embodiment of the present invention.

Referring to FIG. 2, each of the fabric receivers 160 have at least one table 170 corresponding to each filter in buffer request 150. Table 170a represents a VLAN table for a seven port device, table 170b represents a Meter table for a seven port device, table 170c represents a VLAN table for a four port device, and table 170d represents a Meter table for a four port device. In each case, a filter, e.g., port mask 210, is used to determine which of ports 180 each packet will be sent from. Table 170a and table 170c represent port masks, and therefore, will vary in length according to the number of ports that are in each network device. Table 170b shows a meter table for a destination chip and table 170d shows a meter table for another destination chip. According to each meter table, logic, e.g., a meter, associated with each table will count the number of packets and/or bytes being sent from a corresponding network device. Such counter logic will be used instead of ones and zeros; that is, counter logic will be employed in place of a port mask. Preferably, table 170b and table 170d are of the same counter width. However, the number does not have to have particular width, but could be, for example, a 16 bit or 32 bit number.

Figure 3A:
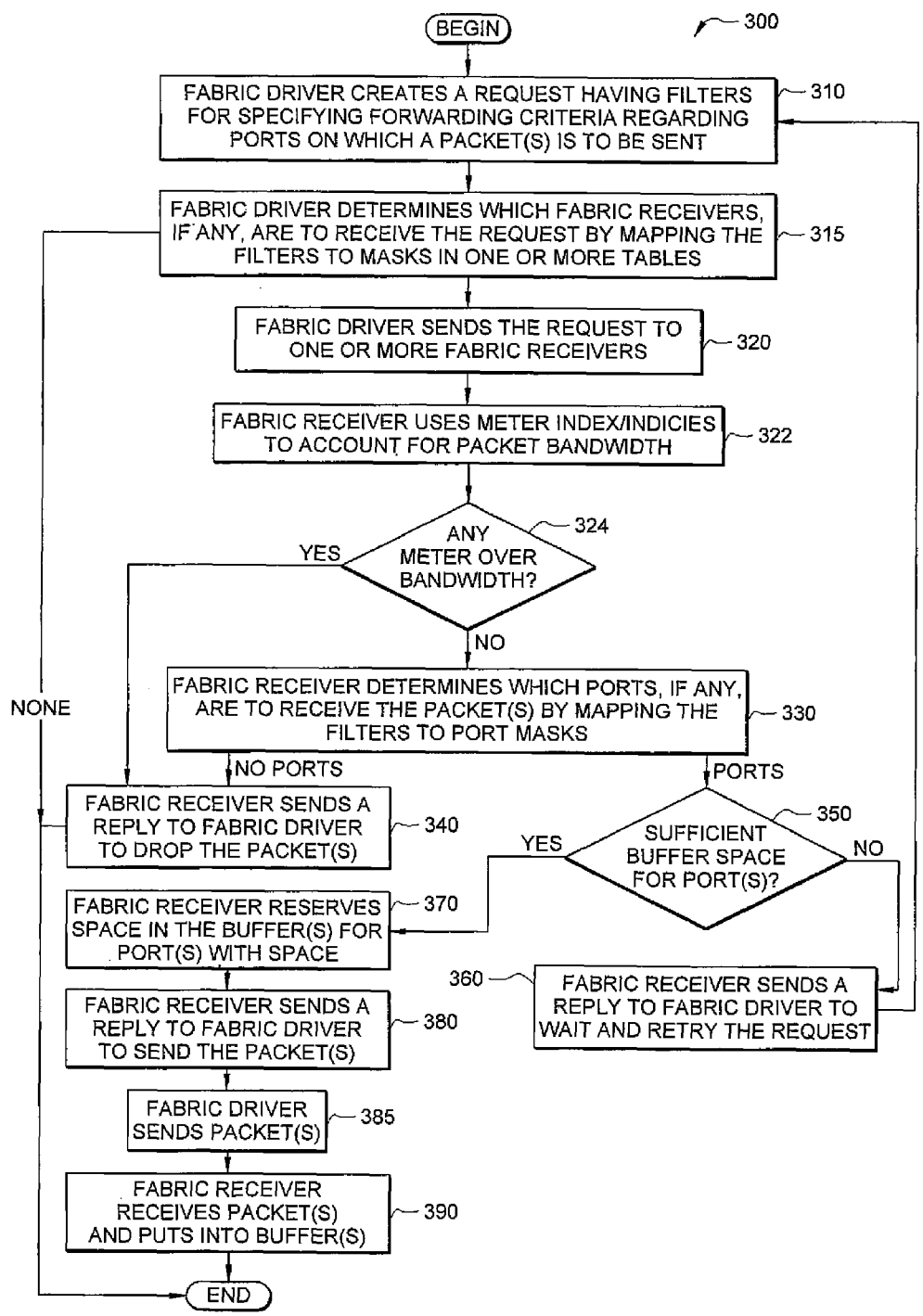
FIG. 3A is a flowchart of a process according to an embodiment of the present invention.

Referring to FIG. 3A an embodiment of a process according to the system described above is shown. The steps shown can be executed as instructions stored on computer readable medium(s). Some steps may be executed by a general purpose processor 135 coupled to or within fabric driver 140 and other steps may be executed by a general purpose processor 135 coupled to or within the fabric receiver(s) 160. In one embodiment, the steps are executed in hardware, for example, via an ASIC.

At step 310, fabric driver 140 creates a buffer request 150 having a number of filters for specifying forwarding criteria for a packet or packets. As a part of step 310, fabric driver 140 may examine an incoming packet to determine the filter indices. The filters may be based on criteria, such as, for example, VLAN membership, packet source port, trunk balancing, multicasting, unicasting, and protocols supported.

At step 315, fabric driver 140 determines which fabric receivers 160, if any, are to receive buffer request 150 by mapping the filters to masks in one or more tables 171. For example, fabric driver 140 indexes at least one table 171 with the filter indices and then performs a logical AND of the results. The result may indicate that no fabric receiver is to receive buffer request 150 because, for example, no port 180 is to receive the packet, based on the filter indices. In this case, the process 300 may end.

At step 320, fabric driver 140 sends buffer request 150 to one or more fabric receivers 160 through a fabric 121. Fabric driver 140 may send multiple buffer requests 150 to fabric receivers 160, wherein they forward packets to ports 180 coupled to those fabric receivers 160. However, embodiments may provide for a single buffer request command 150 being forwarded on to multiple fabric receivers 160 by, for example, the fabric 121. Fabric driver 140 may be referred to as a first logical unit and fabric receiver 160 as a second logical unit. For clarity, steps 320-390 will be discussed will respect to the processing done at a single fabric receiver 160. However, these steps may be undertaken by multiple fabric receivers 160, essentially simultaneously, in the event buffer request commands 150 are sent to multiple fabric receivers 160.

At step 322, fabric receiver 160 uses the meter index or meter indices to account for packet bandwidth. The accounting process begins once fabric receiver 160 receives request 150. This ensures that the meter is counted properly, regardless of which filters are employed.

At step 324, it is determined whether or not a meter is over its available bandwidth. That is, it is determined whether or not the packet traffic is exceeding the allowed bandwidth for the meter. If the meter's bandwidth is not exceeded, process 300 continues to step 330. If the meter's bandwidth is exceeded, process 300 proceeds to step 340.

At step 330, fabric receiver 160 determines which ports 180, if any, are to receive the packet(s) by mapping the filters in buffer request 150 to port masks 210 stored in tables 170. This step may comprise indexing tables 170 with the filter indices to determine bit masks 210 and combining the bit masks 210 to determine the ports 180 that are to receive the packet(s). For example, port masks 210 may be combined by performing a logical AND between the bit masks 210. The fabric receivers 160 may perform this step in parallel and independent of each other in the case that multiple fabric receivers are processing buffer request commands 150.

At step 340, if it has been determined that the bandwidth of a meter has been exceeded, or that no ports are to receive packets, fabric receiver 160 formulates a buffer reply 190 and sends it through fabric 121 to fabric driver 140. In this case, reply 190 contains instructions to fabric driver 140 to drop the packet. Upon receiving this reply, fabric driver 140 will drop the packet(s) and process 300 may end.

Alternatively, if fabric receiver 160 determines that at least one port 180 is to receive the packet, then fabric receiver 160 determines, at step 350, if there is sufficient space in the outbound memory 185 for the port(s) 180 to receive the packet at this time. The decision may be based on whether all ports 180 coupled to a given fabric receiver 160 are ready or whether at least one port 180 is ready.

If there is not sufficient space in the outbound memory 185, fabric receiver 160 formulates a buffer reply 190 that specifies that fabric driver 140 should wait a period of time and retry buffer request 150, in 360. This insufficient memory reply may be sent even if some ports 180 have sufficient room for the packet. For example, if other ports 180 do not have room and an "all-or-nothing" flag was set in buffer request 150, then fabric receiver 160 may formulate a buffer reply 190 for wait and retry. After step 360, the process 300 may repeat by fabric driver 140 waiting a specified period of time and re-sending buffer request 150. When the request is retried, it will be specially marked so step 322 will be skipped—the bandwidth has already been accounted for by the previous attempt to resolve the request.

If there is sufficient memory in outbound memory 185, fabric receiver 160 reserves the space and keeps track of a reservation number and the space reserved in outbound memory 185 for this buffer request 150, at step 370.

Continuing on with the case of sufficient space, fabric receiver 160 formulates and sends a buffer reply 190 that specifies that fabric driver 140 should send the packet, at step 380. If buffer request 150 specifies that not all ports 180 need to be ready to receive, the buffer reply 190 may indicate that at least one port 180 has enough memory associated with it. On the other hand, if the buffer request specified "all-or-nothing", then this buffer reply 190 may indicate that all ports 180 to receive the packet have sufficient associated memory.

At step 385, fabric driver 140 sends the packet to the fabric receiver(s) 160. Fabric driver 140 may also send associated information that specifies the reservation number.

At step 390, fabric receiver 160 receives the packet and associated information that specifies the reservation number. Using the reservation number and the information it saved at step 370, fabric receiver 160 may transfer the packet into the outbound memory 185.

Figure 3B:
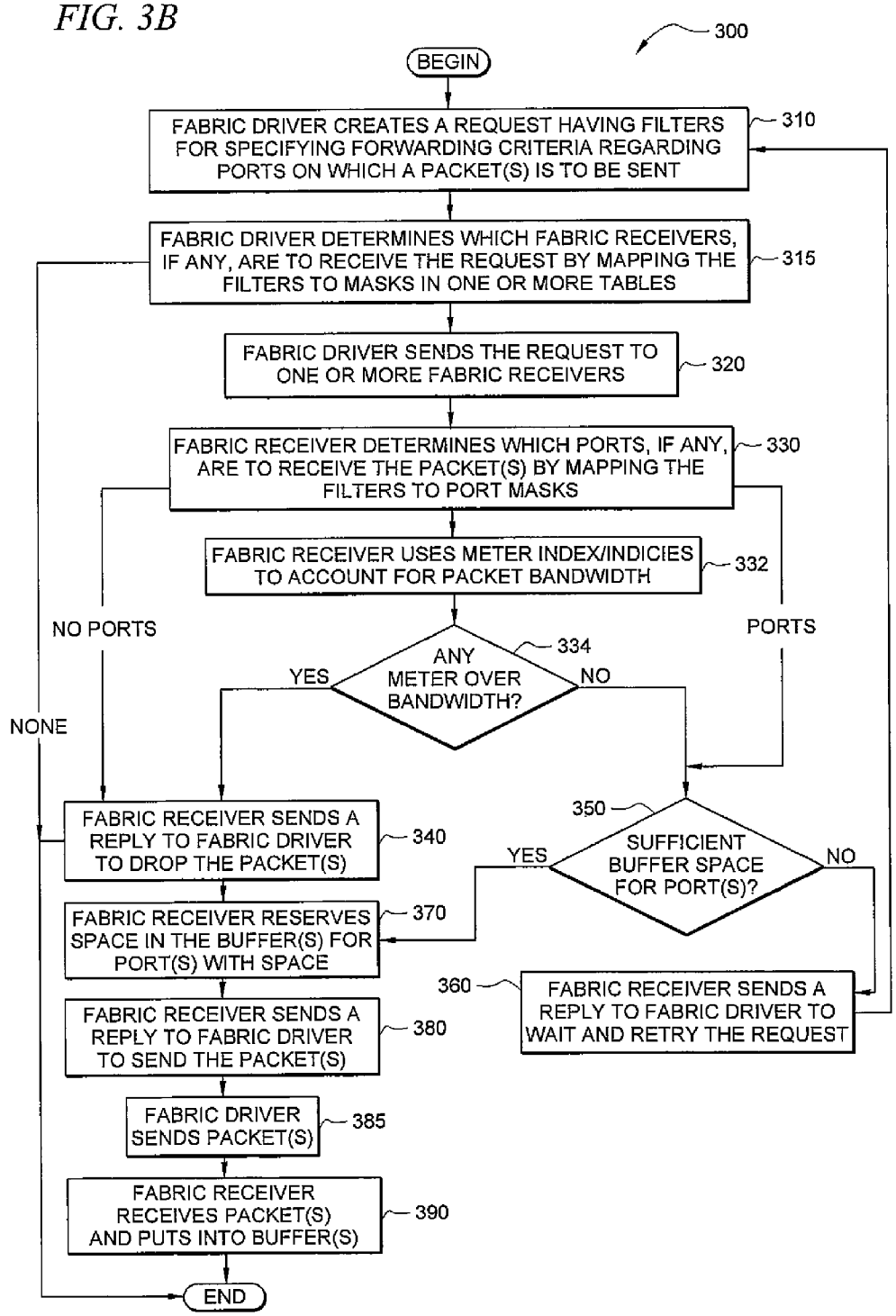
FIG. 3B is a flowchart of a process according to another embodiment of the present invention.

FIG. 3B illustrates another embodiment of a process according to the present invention. FIG. 3B is similar to FIG. 3A, but shows an alternative process where the bandwidth metering described in FIG. 3A is accomplished after step 330 instead of after step 320. At step 332, fabric receiver 160 uses the meter index or meter indices to account for packet bandwidth. At step 334, it is determined whether or not a meter is over its available bandwidth. That is, it is determined whether or not the packet traffic is exceeding the allowed bandwidth for the meter. If the meter's bandwidth is not exceeded, process 300 continues to step 350. If the meter's bandwidth is exceeded, process 300 proceeds to step 340. The embodiment depicted in FIG. 3B is useful as it allows fabric receiver 160 to account for bandwidth after a determination has been made as to which ports are going to receive the packet or packets. Accordingly, the meter is based only on packets that are actually going to be transmitted from that port, or at least, those packets that are actually destined for those ports. As such, the meter is not based on every port in the network device.

Figure 3C:
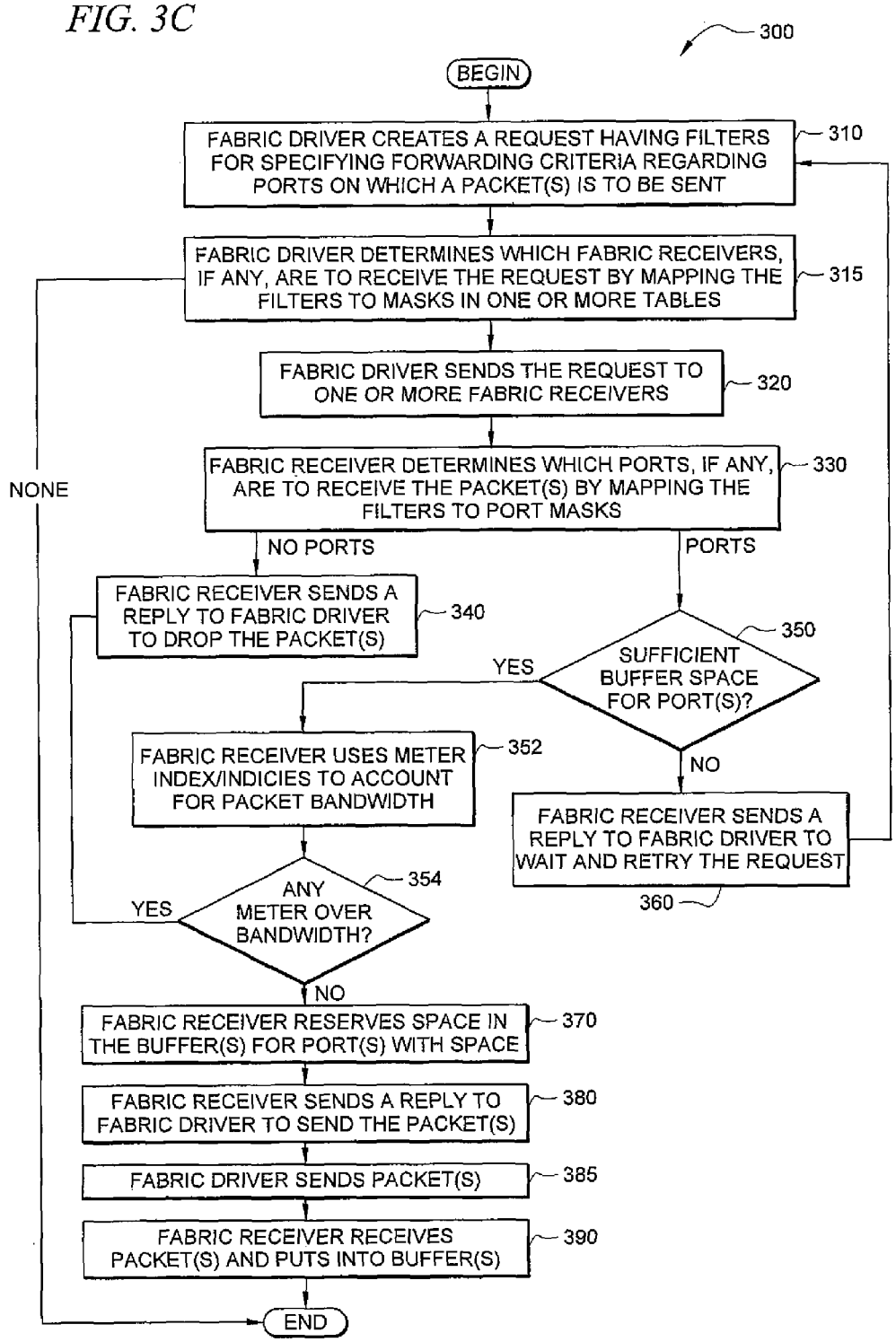
FIG. 3C is a flowchart of a process according to another embodiment of the present invention

FIG. 3C illustrates another embodiment of a process according to present invention. FIG. 3C is also similar to FIG. 3A, but shows an alternative process where the bandwidth metering described in FIG. 3A is accomplished after step 350 instead of after step 320. According to FIG. 3C, if it has been determined that there is sufficient buffer space for the ports at step 350, then the process proceeds to step 352. At step 352, fabric receiver 160 uses the meter index or meter indidices to account for packet bandwidth. At step 354, it is determined whether or not a meter is over its available bandwidth. That is, it is determined whether or not the packet traffic is exceeding the allowed bandwidth for the meter. If the meter's bandwidth is not exceeded, process 300 continues to step 370. If the meter's bandwidth is exceeded, process 300 proceeds to step 340. The embodiment depicted in FIG. 3C is useful as it allows the metering to only count those packet that will actually be sent out to the port(s). Accordingly, metering takes place after it has been determined whether or not the port actually needs the packet and whether or not there is sufficient space in the outbound buffers for the given packet or packets.

Following from the discussion above, the difference between FIGS. 3A, 3B, and 3C can be described in terms of when the meter is counted with respect to execution of other steps in the process. According to FIG. 3A, the meter is counted immediately after request 150 is sent from fabric driver 140. This is beneficial where the meter spans across additional filters. In such case, the meter will count traffic independent of the filter. Such an embodiment is typically implemented where a network operator prefers to ensure that bandwidth is limited by the meter itself. The embodiment shown in FIG. 3B is particularly useful for providing a virtual meter. That is, in the case where the number of available meters are limited, the meters themselves can be reused based on the port filter configurations. As a result, the same meter can be used on a given blade where that meter has, for example a VLAN of 4, and can be reused on another blade where it has, for example, a VLAN of 7. Likewise, the two meters can be then be replicated across blades. Also, a meter on two different blades is able to count different traffic flows because that meter is counted after the port filters are put in place. The embodiment shown in FIG. 3C is useful where the exact bandwidth of outgoing packet traffic needs to be metered. According to this embodiment, only that packet traffic that is actually transferred out the port(s) is actually metered.

It should be appreciated that the embodiments disclosed in each of FIGS. 3A, 3B, and 3C can be implemented in combination with one another. For example, such an implementation may involve providing a global configuration that determines a particular manner in which a meter operates. This would be determined on a meter-by-meter basis across the network devices, where some meters operated according to at least one of the different embodiment described above.

Figure 4:
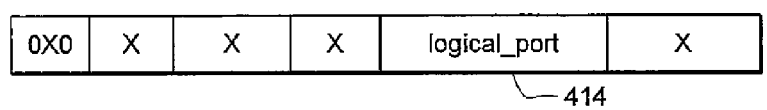
FIG. 4 is a exemplary command frame according to an embodiment of the present invention.
Figure 4:
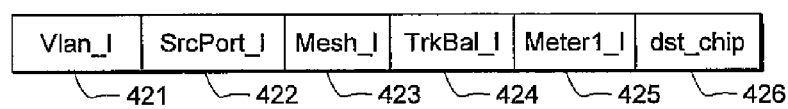
Figure 4:
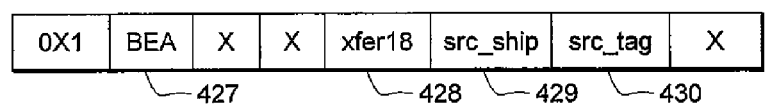
Figure 4:
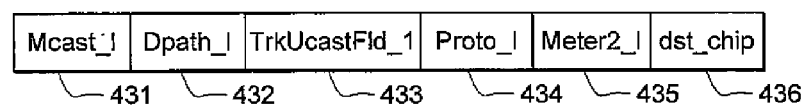

Referring to FIG. 4, a buffer request 150 having filter indices according to the systems described herein is shown. Buffer request 150 contains various fields, many of which are used to filter the packet. Examples of such fields include VLAN index 421, source port index 422, and mesh index 423. Buffer request also contains meter1 index 425, meter2 index 435, which are used to index buffer request 150 into tables 170.

As shown, the first quarter of buffer request 150 command has a logical_port field 414 which may be for logical port number and may allow certain traffic to be stopped, for example, if the source equals the destination. The exemplary commands and fields may be of any suitable length. The second quarter of buffer request command 150 contains the Vlan_I field 421, which may be for specifying a VLAN filter index (i.e., the index values shown in FIG. 2). This and other filter indexes are used by fabric receiver 160 to index a table of bit masks 210.

SrcPort_I field 422 may be used to specify a source port index, defining the source port from which the packet originated. Mesh_I field 423 may be used to specify a mesh index and may be used as a part of a load balancing forwarding process. TrkBal_I field 424 may be used to specify a trunk balancing index and may be used, for example, to load balance between multiple links connecting two nodes. Meter1_I field 425 may be used to specify a first outbound meter index, as described in this application. Dst_chip field 426 may be for specifying the destination fabric receiver 160 for this buffer request 150. Fabric 121 may use this field when routing the buffer request 150.

Referring now to the third and fourth quarters of request buffer 150 of FIG. 4, BEA field 427, in the third quarter of buffer request command 150, may be used for indicating that best effort is acceptable. For example, to accept buffer request 150, fabric receiver 160 need only find a single port 180 with available buffer space in the outbound memory 185. If this bit is cleared it may indicate that all ports 180 that are to receive the packet(s) must have free buffer space.

Length field 428 may be for indicating the number of bytes necessary for the packet. Src_chip field 429 may be for identifying the chip (e.g., fabric driver 140) from which the request is originating and may be used to route the buffer reply 190. Src_tag field 430 may specify information that is echoed back in buffer reply 190 to associate the buffer reply 190 with the buffer request 150.

Referring now to the fourth quarter of the buffer request command 150, Mcast_I field 431 may be for specifying a multicast index, which is used by fabric receiver 160 to index a table 170 of bit masks 210 to determined which ports 180 are to receive the multicast. Dpath field 432 may be for a filter index and may specify data path information that may be related to protocols, for example. TrkUcastFld_I field 433 may be for a TrunklUnicast/Flood filter index and may be used in specifying the destination logical port(s) for unicast packet(s). Proto_I field 434 may be for a protocol filter index and may be for identifying protocols, for example. Meter2_I field 435 may be reserved for a future meter index. Dst_chip field 436 may be identical to the dst_chip information from the second quarter of buffer request command 150.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for metering egress packet traffic at a network device, said method comprising:

creating requests at a first node during packet ingress, said requests comprising one or more egress meter indices and a plurality of filter indices for specifying packet forwarding criteria based on packets to be forwarded; and receiving said requests at a second node before receiving each packet to be forwarded associated with each request, and, in response, specifying which ports are to receive said packets to be forwarded based on filter values of said plurality of filter indices, and metering said packets to be forwarded upon receiving said requests using said one or more egress meter indices wherein said egress meter indices account for bandwidth.

2. The method of claim 1 wherein said one or more egress meter indices specify said filter values for said filter indices based on a packet to be forwarded.

3. The method of claim 1 further comprising determining whether or not said egress packet traffic exceeds allowed bandwidth of said network device.

4. The method of claim 3 further comprising initiating a multi-rate action upon determining said egress packet traffic exceeds allowed bandwidth of said network device.

5. The method of claim 4 wherein said multi-rate action comprises Explicit Congestion Notification (ECN) marking.

6. The method of claim 4 wherein said multi-rate action comprises signaling the packet to be dropped.

7. The method of claim 1 further comprising receiving, at one or more destination chips at the second node, at least one associated meter index, said at least one associated meter index included in said requests and operable to maintain the at least one associated meter index of the one or more destination chips at the second node in sync with associated meters indices on other destination chips.

8. A method for metering egress packet traffic at a network device, said method comprising:

sending a request from a first node before sending a packet to be forwarded associated with the request, said request comprising one or more egress meter indices and a plurality of filter indices for specifying packet forwarding criteria based on the packet to be forwarded;

specifying which ports are to receive said packets to be forwarded based on filter values of said plurality of filter indices;

accounting for packet bandwidth of said network device using said one or more egress meter indices; and metering said egress packet traffic upon receiving said request using said one or more egress meter indices.

9. The method of claim 8 wherein said one or more egress meter indices further specify said filter values for said filter indices based on a packet to be forwarded.

10. The method of claim 8 further comprising determining whether or not said egress packet traffic exceeds allowed bandwidth of said network device.

11. The method of claim 10 further comprising initiating a multi-rate action upon determining said egress packet traffic exceeds allowed bandwidth of said network device.

12. The method of claim 11 wherein said multi-rate action comprises Explicit Congestion Notification (ECN) marking.

13. The method of claim 11 wherein said multi-rate action comprises signaling the packet to be dropped.

14. The method of claim 8 further comprising receiving, at one or more destination chips at the second node, at least one associated meter index, said at least one associated meter index included in said requests and operable to maintain the at least one associated meter index of the one or more destination chips at the second node in sync with associated meters indices on other destination chips.

15. An egress packet traffic metering system for metering egress packet traffic at a network device, said system comprising:

a first node sending a request before sending a packet to be forwarded associated with the request, said request comprising one or more egress meter indices and a plurality of filter indices for specifying packet forwarding criteria based on the packet to be forwarded, wherein said one or more egress meter indices determine the packet bandwidth of said network device; and a second node for metering said egress packet traffic upon receiving said request using said one or more egress meter indices and determining, at the second node, which ports are to receive packets based on filter values of said plurality of filter indices.

16. The system of claim 15 wherein said egress meter indices further specify said filter values for said filter indices based on a packet to be forwarded.

17. The system of claim 15 wherein said one or more egress meter indices determine whether or not said egress packet traffic exceeds allowed bandwidth of said network device.

18. The system of claim 17 further comprising initiating a multi-rate action upon determining said egress packet traffic exceeds allowed bandwidth of said network device.

19. The system of claim 18 wherein said multi-rate action comprises Explicit Congestion Notification (ECN) marking.

20. The system of claim 18 wherein said multi-rate action comprises signaling the packet to be dropped.

21. The system of claim 15 further comprising receiving, at one or more destination chips at the second node, at least one associated meter index, said at least one associated meter index included in said requests and operable to maintain the at least one associated meter index of the one or more destination chips at the second node in sync with associated meters indices on other destination chips.

* * * * *